(12) United States Patent
Chiera et al.

(10) Patent No.: US 8,839,762 B1
(45) Date of Patent: Sep. 23, 2014

(54) MULTI-CHAMBER IGNITER

(71) Applicant: Woodward, Inc., Fort Collins, CO (US)

(72) Inventors: Domenico Chiera, Fort Collins, CO (US); Gregory James Hampson, Boulder, CO (US); Nolan Polley, Fort Colllins, CO (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 13/913,840

(22) Filed: Jun. 10, 2013

(51) Int. Cl.
 *F02B 19/00* (2006.01)
 *F02P 13/00* (2006.01)

(52) U.S. Cl.
 CPC ...................................... *F02P 13/00* (2013.01)
 USPC ............................ 123/256; 123/260; 123/266

(58) Field of Classification Search
 CPC ....... Y02T 10/125; F02B 19/12; F02B 19/08; F02B 19/108; H01T 13/54
 USPC ............. 123/169 R, 253, 254, 260, 262, 263, 123/266, 286, 143 R, 256, 267; 313/143
 See application file for complete search history.

(56) References Cited

U.S. PATENT DOCUMENTS

| 1,009,867 | A | 11/1911 | Terry |
|---|---|---|---|
| 1,242,375 | A | 10/1917 | Robinson |
| 1,253,570 | A | 1/1918 | Berry |
| 1,320,115 | A | 10/1919 | Bloomhuff et al. |
| 1,325,439 | A | 12/1919 | Dinger |
| 1,360,294 | A | 11/1920 | Hill |
| 1,361,347 | A | 12/1920 | Nighswander |
| 1,361,580 | A | 12/1920 | Herz |
| 1,538,750 | A | 5/1925 | Scognamillo |
| 1,596,240 | A | 8/1926 | Dikeman |
| 1,963,801 | A | 6/1934 | O'Marra |
| 2,047,575 | A | 7/1936 | Burtnett |
| 2,127,513 | A | 8/1938 | Harper, Jr. |
| 2,153,598 | A | 4/1939 | Steward |
| 2,208,030 | A | 7/1940 | Holmes |
| 2,299,924 | A | 10/1942 | Ost |
| 2,314,128 | A | 3/1943 | Coldwell |
| 2,416,107 | A | 2/1947 | Litton |
| 2,487,535 | A | 11/1949 | Fernandez |
| 2,497,862 | A | 2/1950 | Chuy |
| 2,586,864 | A | 2/1952 | Rose |

(Continued)

FOREIGN PATENT DOCUMENTS

AT 509876 12/2011
CA 1010329 5/1977

(Continued)

OTHER PUBLICATIONS

Chiera et al., U.S. Appl. No. 13/736,424, Quiescent Chamber Hot Gas Igniter, filed Jan. 8, 2013.

(Continued)

*Primary Examiner* — Stephen K Cronin
*Assistant Examiner* — Sizo Vilakazi
(74) *Attorney, Agent, or Firm* — Fish & Richardson P.C.

(57) ABSTRACT

Air/fuel mixture is received from a combustion chamber of the internal combustion engine into an enclosure about a flame kernel initiation gap between a first ignition body and a second ignition body. Air/fuel mixture received into the enclosure is directed into a flame kernel initiation gap. The mixture is then ignited in the flame kernel initiation gap.

23 Claims, 13 Drawing Sheets

(56) References Cited

U.S. PATENT DOCUMENTS

| | | |
|---|---|---|
| 2,776,394 A | 1/1957 | Cuny et al. |
| 2,843,780 A | 7/1958 | Harper, Jr. |
| 2,895,069 A | 7/1959 | Davis |
| 2,899,585 A | 8/1959 | Dollenberg |
| 2,957,099 A | 10/1960 | Dutterer |
| 3,300,672 A | 1/1967 | Fisher |
| 3,718,425 A | 2/1973 | Weyl et al. |
| 3,958,144 A | 5/1976 | Franks |
| 4,092,558 A | 5/1978 | Yamada |
| 4,098,232 A | 7/1978 | Gleiter |
| 4,124,000 A | 11/1978 | Genslak |
| 4,218,993 A | 8/1980 | Blackburn |
| 4,416,228 A | 11/1983 | Benedikt et al. |
| 4,452,189 A | 6/1984 | Latsch et al. |
| 4,490,122 A | 12/1984 | Tromeur |
| 4,509,476 A | 4/1985 | Breuser et al. |
| 4,795,937 A | 1/1989 | Wagner et al. |
| 4,901,688 A | 2/1990 | Kashiwara et al. |
| 4,930,473 A | 6/1990 | Dietrich |
| 4,963,784 A | 10/1990 | Niessner |
| 4,987,868 A | 1/1991 | Richardson |
| 5,014,656 A | 5/1991 | Leptich et al. |
| 5,051,651 A | 9/1991 | Kashiwara et al. |
| 5,105,780 A | 4/1992 | Richardson |
| 5,107,168 A | 4/1992 | Friedrich et al. |
| 5,369,328 A | 11/1994 | Gruber et al. |
| 5,408,961 A | 4/1995 | Smith |
| 5,421,300 A | 6/1995 | Durling et al. |
| 5,430,346 A | 7/1995 | Johnson |
| 5,554,908 A | 9/1996 | Kuhnert et al. |
| 5,555,862 A | 9/1996 | Tozzi |
| 5,612,586 A | 3/1997 | Benedikt et al. |
| 5,619,959 A | 4/1997 | Tozzi |
| 5,623,179 A | 4/1997 | Buhl |
| 5,647,444 A | 7/1997 | Williams |
| 5,662,181 A | 9/1997 | Williams et al. |
| 5,799,637 A | 9/1998 | Cifuni |
| 5,821,675 A | 10/1998 | Suzuki |
| 5,892,319 A | 4/1999 | Rossi |
| 5,947,076 A * | 9/1999 | Srinivasan et al. ............ 123/267 |
| 6,013,973 A | 1/2000 | Sato |
| 6,060,822 A | 5/2000 | Krupa et al. |
| 6,064,144 A | 5/2000 | Knoll et al. |
| 6,129,069 A | 10/2000 | Uitenbroek |
| 6,129,152 A | 10/2000 | Hosie et al. |
| 6,130,498 A | 10/2000 | Shimizu et al. |
| 6,198,209 B1 | 3/2001 | Baldwin et al. |
| 6,326,719 B1 | 12/2001 | Boehler et al. |
| 6,460,506 B1 * | 10/2002 | Nevinger ...................... 123/260 |
| 6,495,948 B1 | 12/2002 | Garrett, III |
| 6,554,016 B2 | 4/2003 | Kinder |
| 6,611,083 B2 | 8/2003 | LaBarge et al. |
| 6,670,740 B2 | 12/2003 | Landon, Jr. |
| 6,749,172 B2 | 6/2004 | Kinder |
| 6,830,017 B2 | 12/2004 | Wolf et al. |
| 6,913,092 B2 | 7/2005 | Bourgoyne et al. |
| 7,004,444 B2 | 2/2006 | Kinder |
| 7,007,661 B2 | 3/2006 | Warlick |
| 7,007,913 B2 | 3/2006 | Kinder |
| 7,100,567 B1 | 9/2006 | Bailey et al. |
| 7,104,245 B2 | 9/2006 | Robinet et al. |
| 7,409,933 B2 | 8/2008 | Nino |
| 7,615,914 B2 | 11/2009 | Francesconi et al. |
| 7,628,130 B2 | 12/2009 | Johng |
| 7,659,655 B2 | 2/2010 | Tozzi et al. |
| 7,762,320 B2 | 7/2010 | Williams |
| 7,856,956 B2 | 12/2010 | Inoue et al. |
| 7,891,426 B2 | 2/2011 | Williams |
| 7,922,551 B2 | 4/2011 | Tozzi |
| 7,950,364 B2 | 5/2011 | Nerheim |
| 8,033,335 B2 | 10/2011 | Orbell et al. |
| 8,143,772 B2 | 3/2012 | Francesconi |
| 8,181,617 B2 * | 5/2012 | Kuhnert et al. ........... 123/143 B |
| 8,261,711 B2 | 9/2012 | Shimoda |
| 8,286,734 B2 | 10/2012 | Hannegan et al. |
| 8,313,324 B2 | 11/2012 | Bulat et al. |
| 8,322,432 B2 | 12/2012 | Bailey et al. |
| 8,353,337 B2 | 1/2013 | Bailey et al. |
| 8,499,854 B2 | 8/2013 | Mitchell et al. |
| 2004/0061421 A1 | 4/2004 | Morita et al. |
| 2004/0100179 A1 | 5/2004 | Boley et al. |
| 2005/0000484 A1 | 1/2005 | Schultz et al. |
| 2005/0092285 A1 | 5/2005 | Klonis et al. |
| 2005/0211217 A1 | 9/2005 | Boley et al. |
| 2006/0005803 A1 | 1/2006 | Robinet et al. |
| 2007/0069617 A1 | 3/2007 | Tozzi et al. |
| 2007/0236122 A1 | 10/2007 | Borror |
| 2009/0236144 A1 | 9/2009 | Todd et al. |
| 2009/0309475 A1 | 12/2009 | Tozzi |
| 2010/0132660 A1 | 6/2010 | Nerheim |
| 2010/0133977 A1 | 6/2010 | Kato |
| 2011/0036638 A1 | 2/2011 | Sokol et al. |
| 2011/0062850 A1 | 3/2011 | Tozzi |
| 2011/0065350 A1 | 3/2011 | Burke |
| 2011/0297121 A1 | 12/2011 | Kraus et al. |
| 2011/0308489 A1 | 12/2011 | Herden |
| 2012/0000664 A1 | 1/2012 | Nas et al. |
| 2012/0013133 A1 | 1/2012 | Rios, III et al. |
| 2012/0064465 A1 | 3/2012 | Borissov et al. |
| 2012/0103302 A1 | 5/2012 | Attard |
| 2012/0125279 A1 | 5/2012 | Hampson et al. |
| 2012/0125287 A1 | 5/2012 | Chiera et al. |
| 2012/0125636 A1 | 5/2012 | Linde et al. |
| 2013/0042834 A9 | 2/2013 | Chiera et al. |
| 2013/0055986 A1 | 3/2013 | Tozzi et al. |
| 2013/0099653 A1 | 4/2013 | Ernst |
| 2013/0160734 A1 | 6/2013 | Redtenbacher et al. |
| 2013/0192896 A1 | 8/2013 | Bailey et al. |
| 2013/0206122 A1 | 8/2013 | Chiera et al. |

FOREIGN PATENT DOCUMENTS

| | | |
|---|---|---|
| CA | 2320415 | 3/2001 |
| CN | 2825995 | 10/2006 |
| DE | 3230793 | 2/1984 |
| DE | 3913665 | 10/1990 |
| DE | 4422939 | 1/1996 |
| DE | 19624965 | 1/1998 |
| DE | 10143209 | 6/2002 |
| DE | 101 44 976 | 4/2003 |
| EP | 0 675 272 | 10/1995 |
| EP | 1026800 A2 | 8/2000 |
| EP | 0937196 | 9/2000 |
| EP | 1265329 | 12/2002 |
| EP | 1556592 | 10/2003 |
| EP | 1556932 | 7/2005 |
| EP | 1701419 | 9/2006 |
| FI | 121759 | 3/2011 |
| FI | 122501 | 2/2012 |
| FR | 764079 A | 5/1934 |
| FR | 985788 A | 7/1951 |
| FR | 2071129 A5 | 9/1971 |
| FR | 2131938 A2 | 11/1972 |
| FR | 2131938 B2 | 8/1979 |
| FR | 2846042 | 4/2004 |
| GB | 588074 | 5/1947 |
| JP | 50077738 | 6/1975 |
| JP | 57-018283 | 1/1982 |
| JP | 58162719 | 9/1983 |
| JP | H02148588 | 12/1990 |
| JP | 03-011575 | 1/1992 |
| JP | 4133281 | 5/1992 |
| JP | 4262388 | 9/1992 |
| JP | 2008-504649 | 2/2006 |
| RU | 2116474 | 7/1998 |
| SU | 968493 | 10/1982 |
| SU | 1370269 | 1/1988 |
| WO | 87/07777 | 12/1987 |
| WO | 91/06142 | 5/1991 |
| WO | 92/02718 | 2/1992 |
| WO | WO 2004/036013 | 4/2004 |
| WO | WO 2004/036709 | 4/2004 |
| WO | 2004/107518 | 12/2004 |
| WO | WO 2006/011950 | 2/2006 |

(56) References Cited

FOREIGN PATENT DOCUMENTS

| WO | WO 2009/060119 A1 | 5/2009 |
|---|---|---|
| WO | WO 2009/109694 A2 | 9/2009 |
| WO | WO 2009/130376 A1 | 10/2009 |
| WO | WO 2010072519 | 7/2010 |
| WO | WO 2011031136 | 3/2011 |
| WO | WO 2011/101541 | 8/2011 |
| WO | WO 2011128190 | 10/2011 |
| WO | WO 2012 021914 A1 | 2/2012 |

OTHER PUBLICATIONS

Chiera, et al., U.S. Appl. No. 13/833,226, Controlled Spark Ignited Flame Kernel Flow, filed Mar. 15, 2013.
Chiera, et al., U.S. Appl. No. 13/347,448, Controlled Spark Ignited Flame Kernel Flow in Fuel-Fed Prechambers, filed Jan. 10, 2012.
Hampson, et al., U.S. Appl. No. 13/042,599, Pre-Chamber Spark Plug With Tubular Electrode and Method of Manufacturing Same, filed Mar. 8, 2011.
Fino Scholl et al., "Development and Analysis of a Controlled Hot Surface Ignition System for Lean Burn Gas Engines" Proceedings of the ASME 2012 Internal Combustion Engine Division Spring Technical Conference ICES2012, May 6-9, 2012 (12 pages).
Sachin Joshi et al., "On Comparative Performance Testing of Prechamber and Open Chamber Laser Ignition" Journal of Engineering for Gas Turbines and Power, Dec. 2011, vol. 133, pp. 122801-1 to 122801-5.
McIntyre, Dustin L., et al., "Lean-Burn Stationary Natural Gas Reciprocating Engine Operation with a Prototype Miniature Diode Side Pumped Passively Q-Switched Laser Spark Plug" U.S. Department of Energy, National Energy Technology Laboratory, 2008, 14 pages.
"New Spark Plug Concepts for Modern-Day Gasoline Engines," Beru Aktiengesellschaft, MTZ vol. 68, Feb. 2007, 8 pages.
BorgWarner BERU Systems Pre-Chamber Technology, 1 page.
BorgWarner BERU Systems, BERU Industrial Spark Plugs, Feb. 2012, 48 pages.
Maria-Emmanuella McCoole, M.Sc.E.E. et al.; Solutions for Improving Spark Plug Life in High Efficiency, High Power Density, Natural Gas Engines; Proceedings of ICES2006; ASME Internal Combustion Engine Division 2006 Spring Technical Conference; May 8-10, 2006, Aachen, Germany; ICES2006-1417; pp. 1-8.
Dr. Luigi Tozzi et al.; Advanced Combustion System Solutions for Increasing Thermal Efficiency in Natural Gas Engines While Meeting Future Demand for Low NOx Emissions; Proceedings of JRCICE2007; 2007 ASME/IEEE Joint Rail Conference & Internal Combustion Engine Spring Technical Conference; Mar. 13-16, 2006, Pueblo, Colorado USA; JRCICE2007-40026; pp. 1-7.
Jessica Adair et al.; Knock Characterization Using Ionization Detection; GMRC Gas Machinery Conference; Oklahoma City, Oklahoma; Oct. 2006; pp. 1-23.
Hironori Osamura, Development of Long Life and High Ignitability iridium Spark Plug, Technical Paper, Seoul 2000 FISTA World Automotive Congress; Jun. 12-15, 2000 Seoul, Korea; 6 pages.
Hironori Osamura, Development of New Iridium Alloy for Spark Plug Electrodes; SAE Technical Paper Series; 1999-01-0796; SI Engine Components and Technology (SP-1437); International Congress and Exposition Mar. 1-4, 1999; 14 pages.
"Wartsila 34SG Engine Technology for Compressor Drive," Wartsila Engines, Wartsila Corporation 2009, 16 pages.
Chiera et al., "Controlled Spark Ignited Flame Kernel Flow", U.S. Appl. No. 14/045,625, filed Oct. 3, 2013, 60 pages.
Dale, J.D. et al., "Enhanced Ignition for I. C. Engines With Premixed Charge," Lawrence Berkeley Laboratory, Society of Automotive Engineers Annual Congress, Oct. 1980, 52 pages.

\* cited by examiner

US 8,839,762 B1

MULTI-CHAMBER IGNITER

BACKGROUND

Engines operating on gaseous fuels, such as natural gas, are commonly supplied with a lean fuel mixture, which is a mixture of air and fuel containing excess air beyond that which is stoichiometric for combustion. The lean fuel mixture often results in poor combustion such as misfires, incomplete combustion and poor fuel economy. Efforts to improve combustion result in detonation or the use of high energy spark which leads to short spark plug life. One factor that can lead to such events is the poor ability of conventional spark plugs to effectively and consistently ignite a lean fuel mixture in the cylinder of the operating engine.

BRIEF DESCRIPTION OF THE DRAWINGS

FIG. 4B shows no end cap, FIG. 4E shows the ignition bodies of the igniter extended into the antechamber.

Like reference symbols in the various drawings indicate like elements.

DETAILED DESCRIPTION

The concepts herein relate to igniting an air/fuel mixture in a combustion chamber of an engine using an antechamber.

Figure 1:
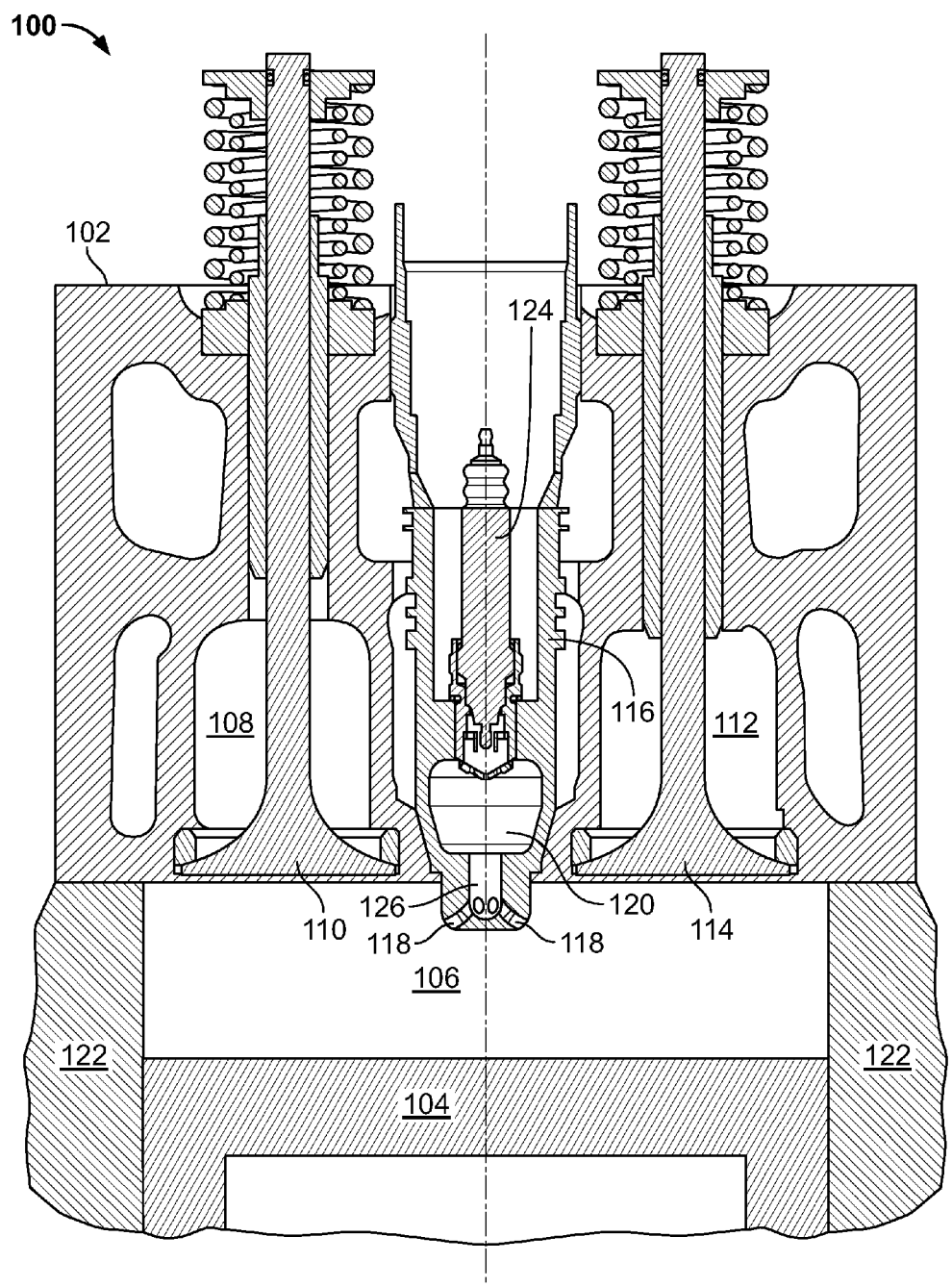
FIG. 1 is a side cross-sectional view of a portion of an internal combustion engine including a prechamber ignition plug in an antechamber.

FIG. 1 shows a cross-section of a portion of an example internal combustion engine 100. The example internal combustion engine 100 is a reciprocating engine and includes a head 102, a block 122, and a piston 104. The piston 104 is located inside a cylinder inside the block 122. The piston 104 is able to reciprocate inside the cylinder during engine operation. The combustion chamber 106 is a volume located inside the cylinder between the head 102 and the piston 104, and is bounded by the block 122.

The example internal combustion engine 100 includes an intake passage 108 with intake valve 110 and an exhaust passage 112 with exhaust valve 114. The passages 108, 112 are in the head 102 adjacent to the combustion chamber 106, and the valves 110, 114 form part of the walls of the combustion chamber 106. During engine operation, the intake valve 110 opens to let a fresh charge of air/fuel mixture flow from the intake passage 108 into the combustion chamber 106. In other instances, the intake valve 110 admits only air and an in-combustion chamber fuel injector admits fuel to form the air/fuel mixture in the combustion chamber 106. After combustion, the exhaust valve 114 opens to exhaust combustion residuals out of the combustion chamber 106 and into the exhaust passage 112. Although the concepts herein are described herein with respect to a reciprocating internal combustion engine, the concepts could be applied to other internal combustion engine configurations.

The example internal combustion engine 100 includes an example igniter plug carrier 116 housing an igniter plug 124. The igniter plug carrier 116 is located in the head 102 and is threadingly and/or otherwise coupled to the head 102. In some instances, the igniter plug carrier 116 can extend into the combustion chamber 106, be flush with a wall of combustion chamber 106, or be recessed from a wall of combustion chamber 106. The example igniter plug 124 is housed inside the example igniter plug carrier 116 and is secured to the carrier threadingly and/or otherwise.

The antechamber 120 is a volume inside the carrier 116 adjacent to but separate from the combustion chamber 106. In some instances, the antechamber 120 can be formed in the head 102 itself and the carrier 116 can be omitted. The antechamber 120 is also adjacent to but separate from the interior of the igniter plug 124. In other instances, rather than being in a separate carrier, the antechamber 120 can be integrated with the igniter plug 124 (e.g., in a common or conjoined housing). The antechamber 120 is shown having a symmetrical shape about the centerline of the carrier 116 and igniter plug 124, but in other instances it could be an asymmetrical shape. The antechamber 120 is shown having a largest transverse interior dimension (e.g., diameter) that is larger than the largest transverse interior dimension of igniter plug 124 and shell. The antechamber 120 also has larger interior volume than the fluid containing volume of the plug 124. In certain instances, the antechamber 120 can be 10, 20 or even 30 times the volume of the fluid containing volume of the plug 124.

The example igniter plug carrier 116 includes openings 118. The openings 118 include external ends which terminate at the exterior of the carrier 116 and are nominally located inside the combustion chamber 106. The internal ends of the openings 118 converge to a central passage 126 that opens into the antechamber 120. The openings 118 can number one or more and can be located on the carrier 116 in a symmetric or asymmetric pattern, diverging from the central passage 126. The openings 118 allow charge, flame, and residuals to flow between the antechamber 120 and the combustion chamber 106. As discussed in more detail below, after the air/fuel mixture in the antechamber 120 is ignited, the openings 118 and central passage 126 operate as jet passages to nozzle combusting air/fuel mixture from the antechamber 120 into divergent flame jets that reach deep into the combustion chamber 106 and ignite the charge in the combustion chamber 106. The openings 118 and central passage 126 also nozzle fresh air/fuel mixture from the combustion chamber 106 into the plug 124. The central passage 126 nozzles the flow into a consolidated flow along the center of the antechamber 120 directed primarily toward the igniter plug 124.

The igniter plug 124 is a device configured to initiate a flame kernel to ignite the charge in the combustion chamber, such as a spark plug, hot surface igniter, laser igniter, and/or other type of igniter. The plug 124 of FIG. 1 is "prechamber" type plug in that it includes an enclosure that encloses the location of flame kernel initiation. This enclosure is, itself, enclosed within the antechamber 120. The igniter plug 124, however, can be other configurations, including an open ended plug. Also, the spark surface may be recessed within the igniter plug cavity with or without a flow restricting end cap or be extended into the antechamber 120.

Figure 2:
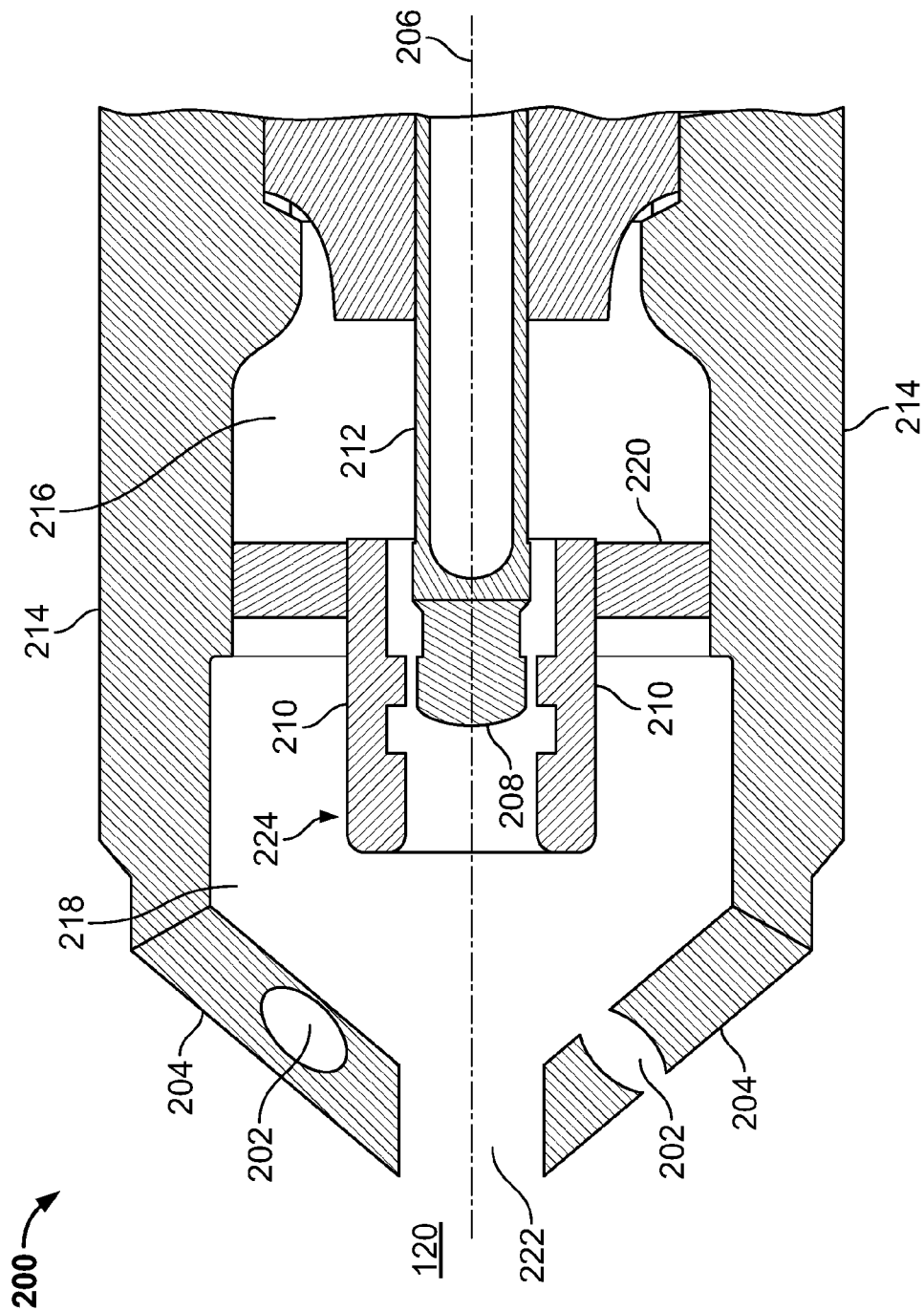
FIG. 2 is a half side cross-sectional view of a portion of an example prechamber spark plug.

FIG. 2 illustrates a cross-sectional view of an example igniter plug 200 that can be used as plug 124. Other configurations of igniter plugs can be used.

The example igniter plug 200 is elongate and centered around a longitudinal central axis 206. In the example igniter plug 200, the central ignition body 208 that extends along the longitudinal axis 206 and further extends from a base 212. In the example igniter plug 200, the second ignition body 210 is tubular and is disposed inside a shell 214. In instances where the igniter plug is a spark plug, the base 212 is an insulator and the center ignition body 208 and the second ignition body 210 are two electrodes that form a spark gap at the narrowest point between the bodies. In instances where the igniter plug is a heated surface igniter, one or both of the center ignition body 208 and the second ignition body 210 are heated surfaces for initiating a flame kernel in the gap between the bodies.

The tubular ignition body 210 surrounds the center ignition body 208 and has a tubular portion that extends axially forward beyond the end of center ignition body 208. This tubular portion forms a velocity control tube 224. The velocity control tube 224 is a tubular structure that, in FIG. 2, is shown extending beyond the end of the center ignition body 208. The velocity control tube 224 is configured to collect and direct flow into a flame kernel initiation gap (e.g., spark gap) between the center ignition body 208 and the tubular ignition body 210. The velocity control tube 224 and tubular ignition body 210 can be cylindrical, polygonal, or some other shape. The center ignition body 208 similarly has a cylindrical shape, a polygonal shape, or some other shape. The ignition bodies can also have a variable shape along their axial length. The tubular ignition body 210 and center ignition body 208 may or may not be the same or corresponding shape. Also, although the velocity control tube 224 and tubular ignition body 210 are both shown as being continuous without breaks, they need not be without breaks. In certain instances, the tubular ignition body 210 can be formed of multiple ground electrodes that converge around the center ignition body 208 but do not contact and form a generally tubular shape. Other arrangements of ignition bodies (i.e., other than a tubular ignition body surrounding a central ignition body) are within the concepts herein, including a standard J-Gap plug having a J-shaped ignition body. Also, the ignition body (whether tubular, J-shaped or otherwise) can be provided with or without the velocity control tube 224.

The plug 200 includes a shell 214 that is a portion of the enclosure. The shell 214 defines a fluid containing volume of the plug 200 containing a forward zone 218 in front of the flame kernel initiation gap and a back zone 216 behind the flame kernel initiation gap. The shell 214 is attached to the base 212 and holds an end cap 204, or a nozzle, but, as described below, may also function without an end cap 204. An end cap 204 constitutes another portion of the enclosure and a front end of the forward zone 218 of the igniter plug 200. In certain instances, the end cap 204 can be integrated into the shell 214 (formed as a single piece), as opposed to being a separate piece attached to the shell 214 as is shown. The shell 214 and end cap 204 define a male conical shape that protrudes into the antechamber 120 to facilitate recirculation within the antechamber 120 (discussed below). In other instances, the end cap 204 can be flat, have a domed shape, or have another shape. The end cap 204 has a center opening 222 and a plurality of peripheral openings 202. The center opening 222 is configured to direct flow incoming into the forward zone 218 primarily towards and into the interior of the velocity control tube 224 and into the flame kernel initiation gap. The peripheral openings 202 are configured to direct flow incoming into the prechamber primarily to an exterior of the tubular ignition body 210 and to swirl around the prechamber 218. Thus, in certain instances, the center opening 222 is axially oriented and aligned with the longitudinal axis 206, and the peripheral openings are neither parallel nor perpendicular to the longitudinal axis 206. Each of the peripheral openings 202 can be the same size (i.e., have the same cross-sectional flow area) or they can be different sizes. The center opening 222 can, likewise, be the same size as the peripheral openings 202 or of a different size. As discussed in more detail below, after the charge in the prechamber is ignited, the openings 202, 222 operate as jet passages that nozzle combusting air/fuel mixture from the prechamber into flame jets that reach deep into the antechamber 120 and ignite the charge in the antechamber 120. Prior to ignition, the openings 202, 222 operate as jet passages that nozzle fresh air/fuel mixture from the antechamber 120 into jets into the prechamber.

The tubular electrode 210 is shown supported from a disk portion 220 mounted to the interior sidewall of the shell 214. In other instances, the tubular ignition body 21 can be supported from one or more legs that extend from a rearward end of the prechamber. Other configurations are within the concepts herein.

Figure 3A:
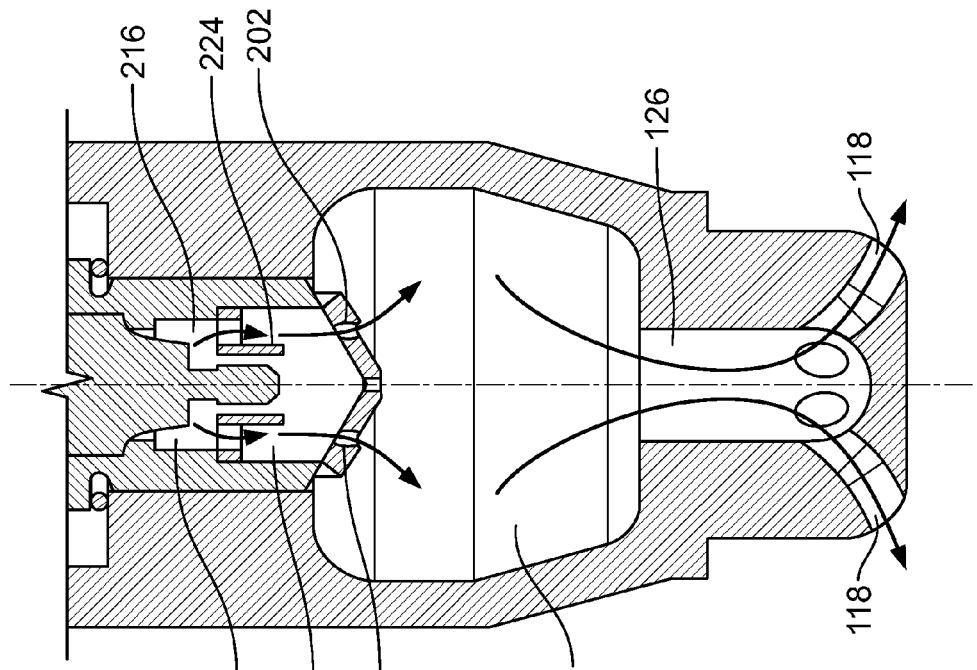
FIGS. 3A and 3B are half side cross-sectional views of a portion of the example prechamber ignition plug and antechamber showing flow into and out of the prechamber and antechamber before and after ignition.
Figure 3B:
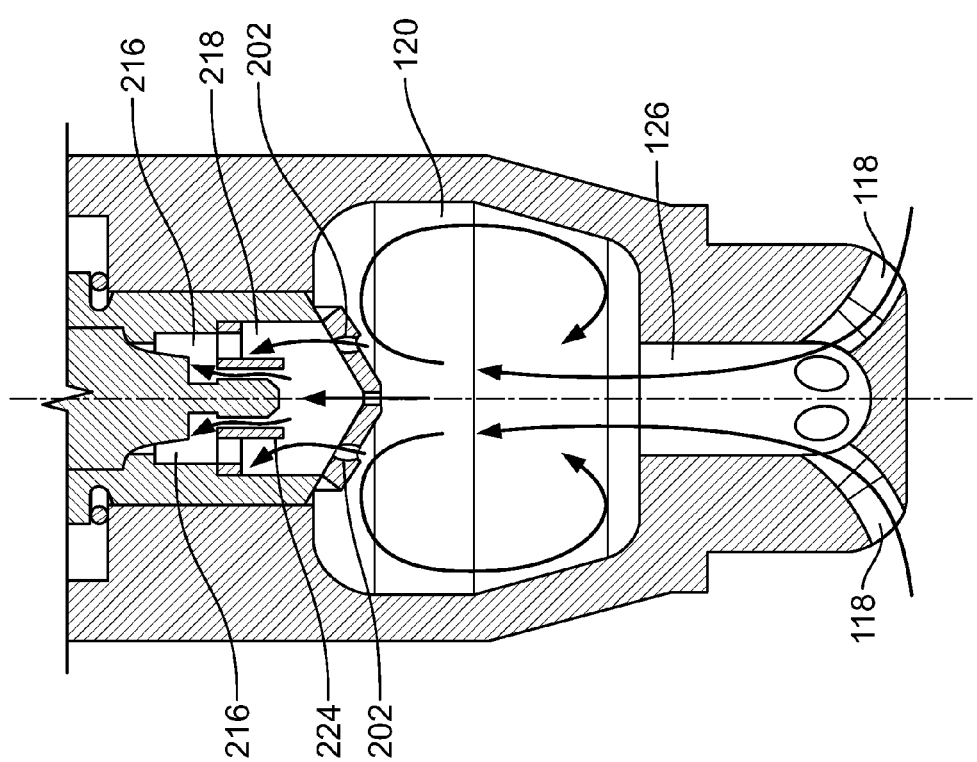

FIG. 3A and FIG. 3B show a portion of the example igniter plug 200 and example antechamber 120. FIG. 3A shows arrows indicating flow into the antechamber 120 and igniter plug 200 prior to ignition of the air/fuel mixture. FIG. 3B shows arrows indicating flow out of the igniter plug 200 and the antechamber 120 after ignition of the air/fuel mixture has begun.

In operation of the engine, the compressive action of the piston 104 forces a portion of the cool (relative to residual combustion gasses), fresh air/fuel mixture to flow from the combustion chamber 106 into the antechamber 120 through the openings 118 and central passage 126 (FIG. 3A). The central passage 126 operates as a nozzle, and in some instances a converging nozzle, to direct the flow into the antechamber. Thus, for example, the central passage 126 has cross-sectional flow area equal to or less than the combined flow area of openings 118. The central passage 126 nozzles the incoming cool, fresh charge into a central high-velocity flow primarily directed to impinge on the end cap 204 and into the center opening 222 and peripheral openings 202 of the plug 200. The central flow has a higher velocity than flow elsewhere in the antechamber 120, and tends to displace residual combustion gasses away from the front of the igniter plug 200 and its openings 202, 222 to feed the cool, fresh air/fuel mixture into the forward zone 218 and into the flame initiation gap. A portion of the fresh air/fuel mixture entering the antechamber 120 does not enter the prechamber, but rather circulates within the antechamber 120 trapping the residuals displaced from in front of the igniter plug 200 into a recirculation loop away from the end of igniter plug 200 (FIG. 3A).

The interior walls of the antechamber 120 are configured to direct the portion of the incoming flow into a toroidal vortex within the antechamber 120. The upper end of the antechamber 120 adjacent the entrance of the plug 200 has a wall that transitions in a smooth curve to the sidewalls of the antechamber 120. Flow from the central passage 126 impinging on or stagnating on the igniter plug 200 that is not received into the igniter body 128 is deflected laterally by the conical end of the igniter plug 200 and guided to circulate in a toroidal vortex by the upper end wall and the smooth curve to the sidewalls around the outer perimeter of the antechamber 120. The conical end of the igniter plug 200 and smooth curve to the sidewalls can be configured to reduce flow separation and other disturbances to the flow in creating this toroidal vortex. In certain instances, the upper end wall is orthogonal to the central axis of the plug 200 and antechamber 120 to guide the flow around to the outer perimeter of the sidewalls, but it could be another shape. The sidewalls transition in a smooth curve to the lower end of the antechamber 120. The lower end wall guides the circulating flow into the flow from the central passage 126 in a manner that encourages the circulating flow to turn and flow back upward. For example, the walls guide the circulating flow to re-enter the flow from the passage 126 orthogonally (precisely and/or substantially) to the primary direction of flow or generally in the primary direction of the flow from the passage 126 (i.e., not counter to the primary direction of flow). Recombining the flow in this manner does not substantially counter the incoming flow, and thus substantially maintains the flow velocity from the central passage 126 to the igniter plug 200 that sweeps residuals in front of the plug 200 and feeds the igniter plug 200 with cool, fresh air/fuel mixture. In certain instances, the lower end wall is orthogonal to the central axis and directs the circulating flow orthogonally (precisely or substantially) into the flow from the central passage 126. In other instances, the wall can have a non-zero angle (and introduce the flow at a non-zero angle) to the central axis and primary direction of flow from the central passage 126. The resulting circulation creates a toroidal vortex of flow in the antechamber 120 that provides a controlled degree of turbulence within the antechamber 120. Also, as the central flow and the vortex flow meet, the mixing of the flows creates turbulence. Finally, the toroidal vortex confines residual combustion gasses within the circulation in the antechamber 120, away from the igniter plug 200.

The igniter plug 200 can have a depression (i.e., a bowl) located on the end. Prior to ignition, the depression collects the impinging central flow at exterior the end cap 204 by partially blocking lateral flow off the igniter plug 200 and creates a higher pressure in this region. Coupled with the high velocity of the central flow, this higher pressure tends to drive the central flow into the igniter frontal zone 218 and creates a higher pressure within the prechamber than generally in the antechamber 120. (It should be noted that the pressure within prechamber is still less than that of the combustion chamber 106.) The air/fuel mixture impinging on the plug 200 flows into the frontal zone 218 through the center opening 222 and through the plurality of openings 202. The center opening 222 directs the air/fuel mixture primarily to the interior of the velocity control tube 224 that, in turn, directs the flow into the flame kernel initiation gap between center ignition body 208 and tubular ignition body 210. The velocity control tube 224 collects the flow from the center opening 222 (by blocking lateral flow off the center ignition body 208) and causes the flow in the interior of the tube 224 to stagnate and create a higher pressure than the pressure around the exterior of the tube 224 and the pressure at the exit of the tubular ignition body 210. The velocity of the flow from the center opening 222 together with the pressure differential creates backward preferential velocity flow, guided by the velocity control tube 224 and tubular ignition body 210, through the flame initiation gap towards the back chamber 216 (FIG. 3A). This flow through the flame initiation gap forces the last combustion event residuals backwards and out of the flame initiation gap region, effectively purging the flame initiation gap of residuals and providing the flame initiation gap with a healthy supply of fresh air/fuel mixture. Purging the residuals backwards (away from the end cap) out of the flame initiation gap, in certain instances, can lead to exceptionally low coefficient of variation (COV).

The air/fuel mixture in the flame initiation gap is ignited in the flame kernel initiation gap (e.g. by a spark arcing between the central ignition body 208 and the tubular ignition body 210, by the heated surfaces of the central ignition body 208 and/or the tubular ignition body 210, and/or in another manner). The velocity of the air/fuel mixture in the gap causes the initial flame kernel to be transported into the back zone 216. Removal of the flame kernel from the flame initiation gap and into the back zone can, in certain instances, reduce the temperature of the flame initiation surfaces of the ignition bodies both because the kernel is moved away from the flame initiation surfaces quickly and because the flow from the central opening 222 is a constant source of cool (cooler than combustion products) air/fuel mixture. Reducing the temperature of the flame initiation surfaces reduces a primary factor in flame initiation plug loss of life: high temperature oxidation of the flame initiation surface in the presence of high temperature oxidizing environment. Removal of the flame kernel from the flame initiation gap also reduces the quenching effect of the ignition bodies 208, 210 on the growing flame kernel, thus, promoting a stronger kernel and healthier combustion event.

The peripheral openings 202 are oriented to introduce a swirling motion to the incoming air/fuel mixture and direct flow primarily exterior of the tubular ignition body 210 and velocity control tube 224. Therefore, the swirling air/fuel mixture flows past the outside of the velocity control tube 224 and tubular ignition body 210 toward the back chamber 216 where it is ignited by the flame kernel. The velocity control tube 224 and tubular ignition bodies 210 act to shield and protect the flow in the flame initiation gap from flow disturbances due to the swirling motion of the surrounding outside flow until the kernel is established and exits from the rear of the tubular ignition body 210. The turbulence caused by the swirling motion of the air/fuel mixture distributes the growing flame kernel around the back chamber 216 predominantly consuming the air/fuel mixture in the back chamber 216 before consuming the air/fuel mixture in the front of the igniter 218. This results in a rapid increase in pressure inside the igniter 218 as combustion of the air/fuel mixture proceeds from the back chamber 216 to the front zone of the igniter 218. In certain instances, the mean maximum pressure rise from combustion of the air/fuel mixture inside the igniter 218 is greater than 15 bar and, in certain instances, greater than 20 bar or 30 bar over the mean maximum pressure of the combustion chamber prior to ignition. Such pressures can be achieved without fuel feed or fuel enrichment into the igniter 218 or antechamber 120. The increased pressure created in the prechamber by the combustion causes the combusting air/fuel mixture to jet out the openings 202, 222 as a flame and into the antechamber 120 (FIG. 3B). During combustion of the air/fuel mixture in the front zone 218, the enclosure protects the growing flame from turbulence (and relatively less quiescent flow patterns) in the antechamber 120 and in the combustion chamber 106.

The antechamber 120 provides a large, volume in which the flow can be controlled so as to protect the flame source and where the flame can grow protected from turbulence in the combustion chamber 106. Once the flames have been jetted into the antechamber 120, the vortex flow and turbulence inside the antechamber 120 promotes combustion, distributing the growing flame around the antechamber 120. The increased pressure generated by the growing flame in antechamber 120 forces the flame to jet out the openings 118 into the combustion chamber 106. Larger flame jets generated by the flame inside antechamber 120 cause faster and more complete combustion of the air/fuel mixture inside the combustion chamber 106 than would jets from the igniter openings 202, 222.

Although shown as a passively fueled antechamber 120, where the combustible fuel enters only via the openings 118, in other instances, the antechamber 120 can include active injection of fuel via a delivery tube into the antechamber 120 to enrich the mixture or into the prechamber spark plug volume as well. In many instances, however, the turbulence generation in the antechamber is sufficient to generate fast enough turbulence enhanced combustion that fuel feed or fuel enrichment are not necessary to achieve rapid combustion and high pressure rise in the antechamber.

Notably, ignition can be delayed by the flow of the flame kernel to the back chamber 216 and the flow of the flame back through the front zone of the igniter 218 and antechamber 120 and into the combustion chamber 106. Because this increased ignition delay time results in a more complete burn, the process is more repeatable and has less variation, and therefore a lower COV. An additional benefit of the delay in ignition is that the flame initiation can be initiated sooner in the combustion cycle when the cylinder pressure is lower than would be the case without the ignition delay. Initiating the flame initiation when the cylinder pressure is lower prolongs the life of the flame initiation surfaces of the igniter plug 200. A lower cylinder pressure requires less voltage to initiate a flame initiation, and a lower power causes less erosion of the spark surfaces. In some implementations, the flame initiation can be initiated 10-12 degrees of crank angle earlier than a traditional flame initiation plug.

FIGS. 4A-4G are cross-sectional views of several other example igniter plugs that can be used as igniter plug 124 and several other example antechambers. Except as described below, the additional example igniter plugs and antechambers of FIGS. 4A-4G are substantially similar to and operate similarly to the examples shown in FIGS. 1-3.

Figure 4A:
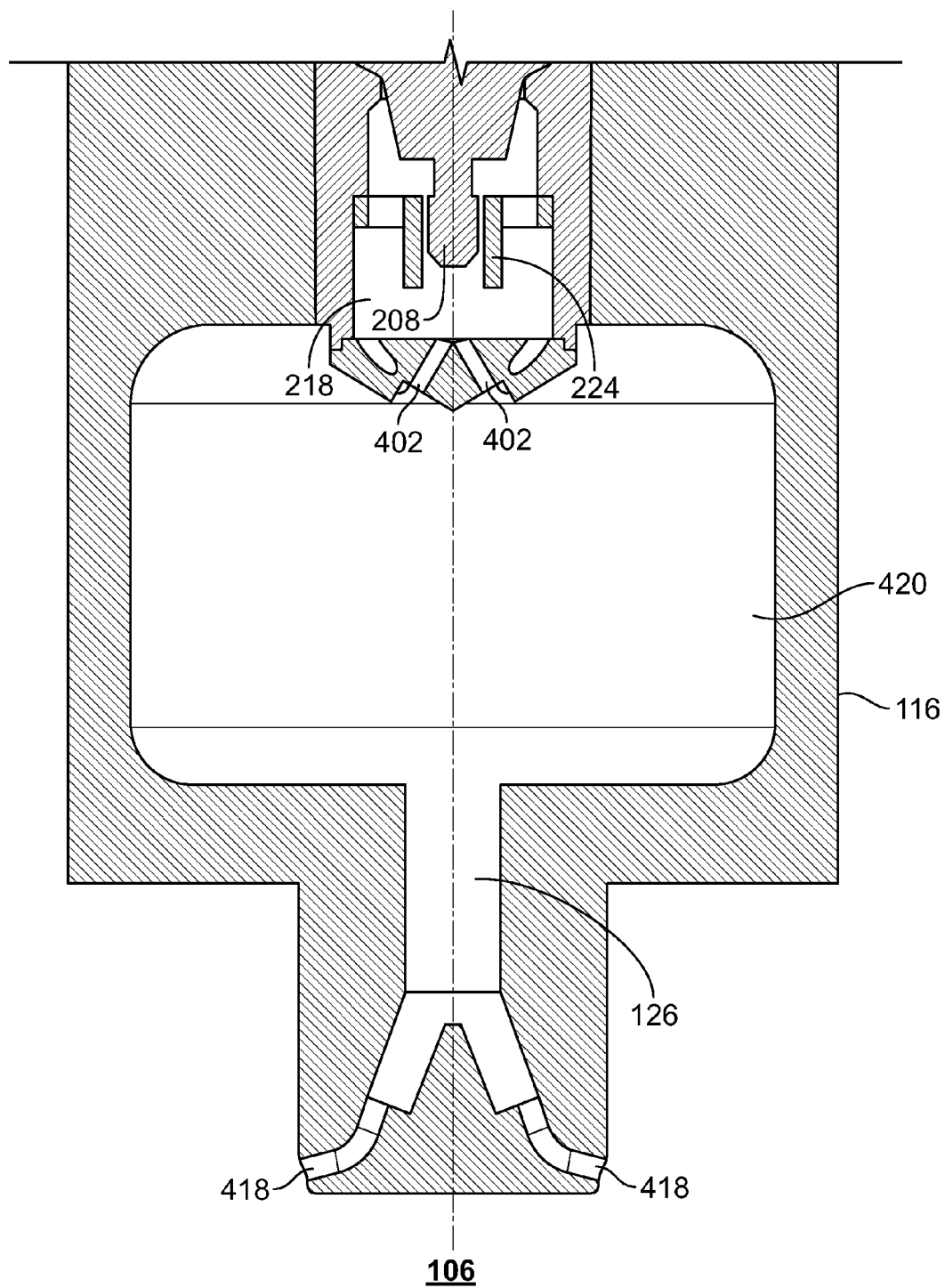
FIGS. 4A-G are half side cross-sectional views of other examples of igniter plugs and antechambers, where

The example igniter plugs each have a slightly different configuration at their end. FIG. 4A has an end cap with a plurality of converging openings 402 that converge to the centerline of the igniter plug. After ignition, the openings 402 operate as jet passages to nozzle combusting air/fuel mixture from the prechamber into divergent flame jets that reach deep into the antechamber 420 and ignite the charge in the antechamber 420. Prior to ignition, the openings 402 converge flow of cool, fresh air/fuel mixture into a jet of flow primarily oriented into the tubular body 224. The exterior openings of the openings 402 are within the bowl on the end of the igniter plug to facilitate entry of the fresh air/fuel mixture into the igniter frontal zone 218. Peripheral openings may be included or omitted.

Figure 4B:
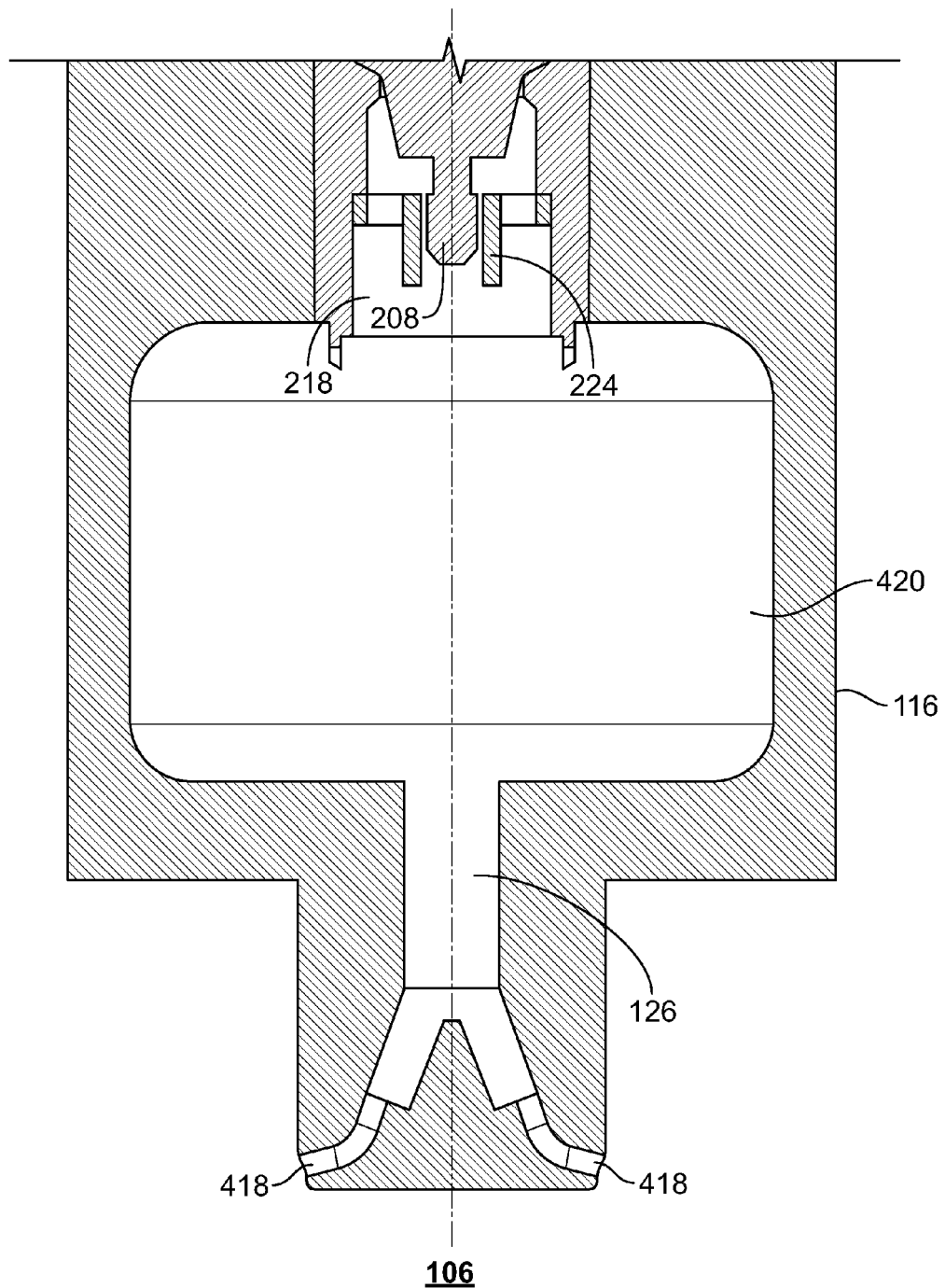

FIG. 4B is an igniter plug that has no end cap, rather it has an open end. The shell 214 defines a cavity in the interior of the ignition plug, but the cavity is not enclosed. The open end presents no substantial flow restriction against cool, fresh air/fuel mixture flowing directly into the front zone 218 and tubular body 224 prior to ignition. The incoming fresh charge increases the pressure in front and back zones 218, 216 until a sufficiently high pressure rejects the incoming flow, redirecting a portion laterally to generate the toroidal vortex in the antechamber 420 described above. In certain instances (of this configuration or other configurations described herein), radial spokes holding the tubular body 224 and tubular ignition body 210 around the central ignition body 208 can be canted or angled to induce swirl within the back chamber 216. The swirl provides a specified degree of turbulence that facilitates rapid and complete combustion of the air/fuel mixture within the igniter plug that, in turn, ignites the charge in the antechamber 420.

Figure 4C:
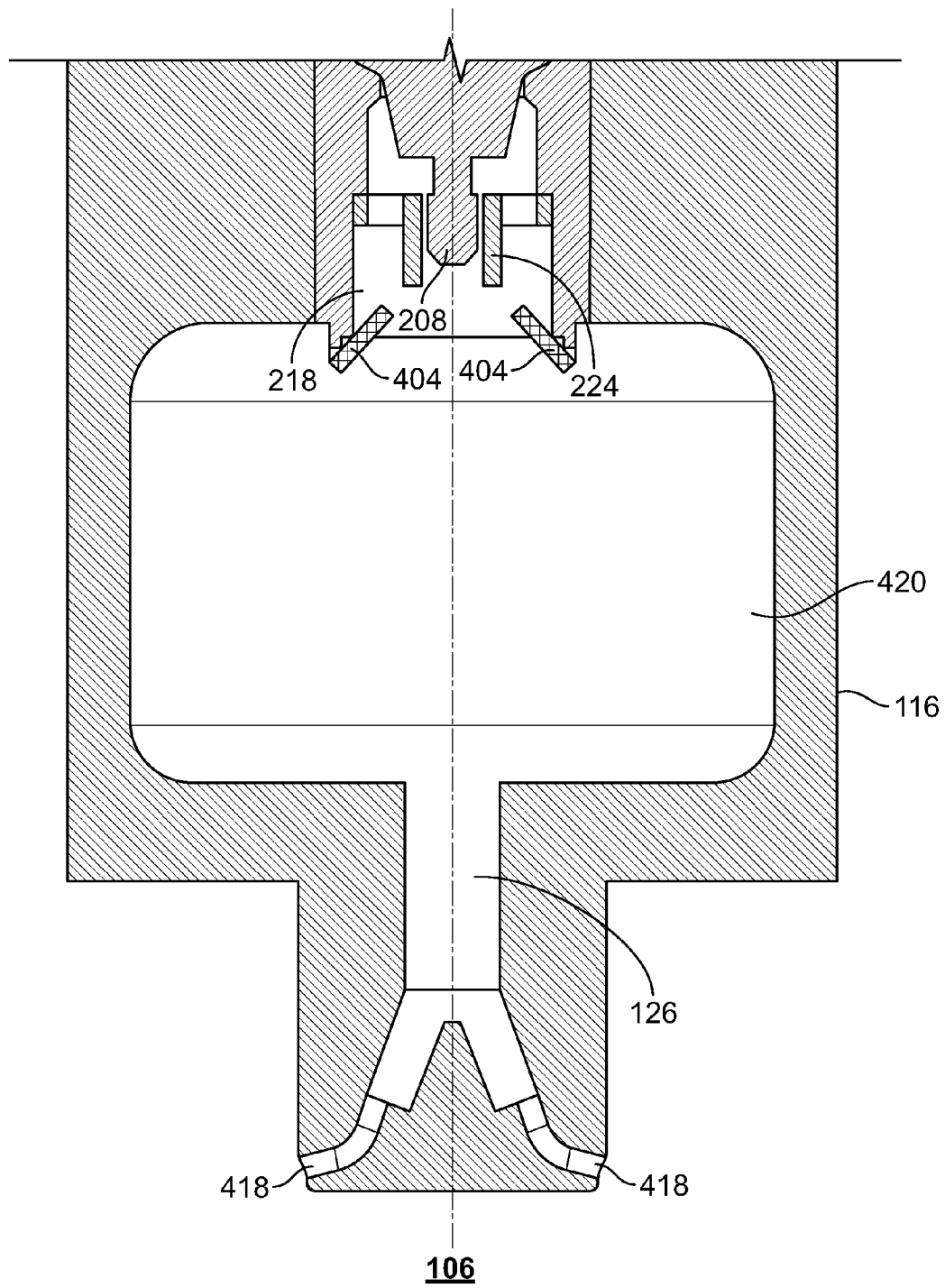
Figure 4D:
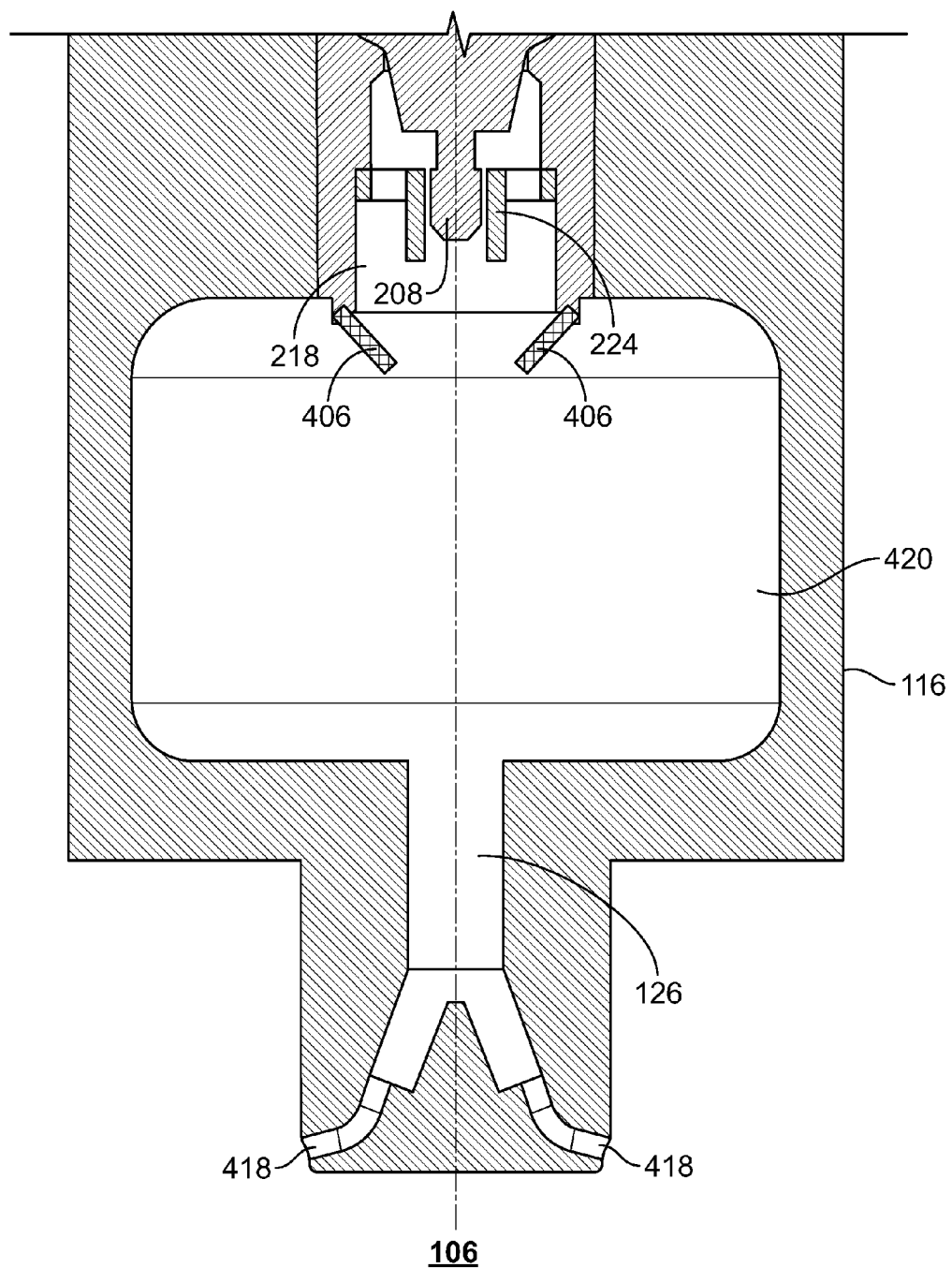

FIG. 4C is an igniter plug that has an end cap 404 that presents a female, converging cone to the flow incoming from the central passage 126 of the antechamber. The conic end cap 404 defines a single central opening, and may be provided with or without peripheral openings. Prior to ignition, the conic end cap 404 is a jet passage that converges and nozzles cool, fresh air/fuel mixture into the prechamber, with a substantial portion of the air/fuel mixture being primarily directed into the tubular body 224. The conic end cap 404 also directs a portion of the incoming fresh charge laterally to recirculate within the antechamber 420. After ignition, the central opening is a jet passage that jets the flame present in the prechamber deeply into the antechamber 420 to ignite the air/fuel mixture in the antechamber 420. In other instances, as in FIG. 4D, the end cap 406 can present a male, diverging cone to the flow incoming from the central passage 126 of the antechamber 420.

Figure 4E:
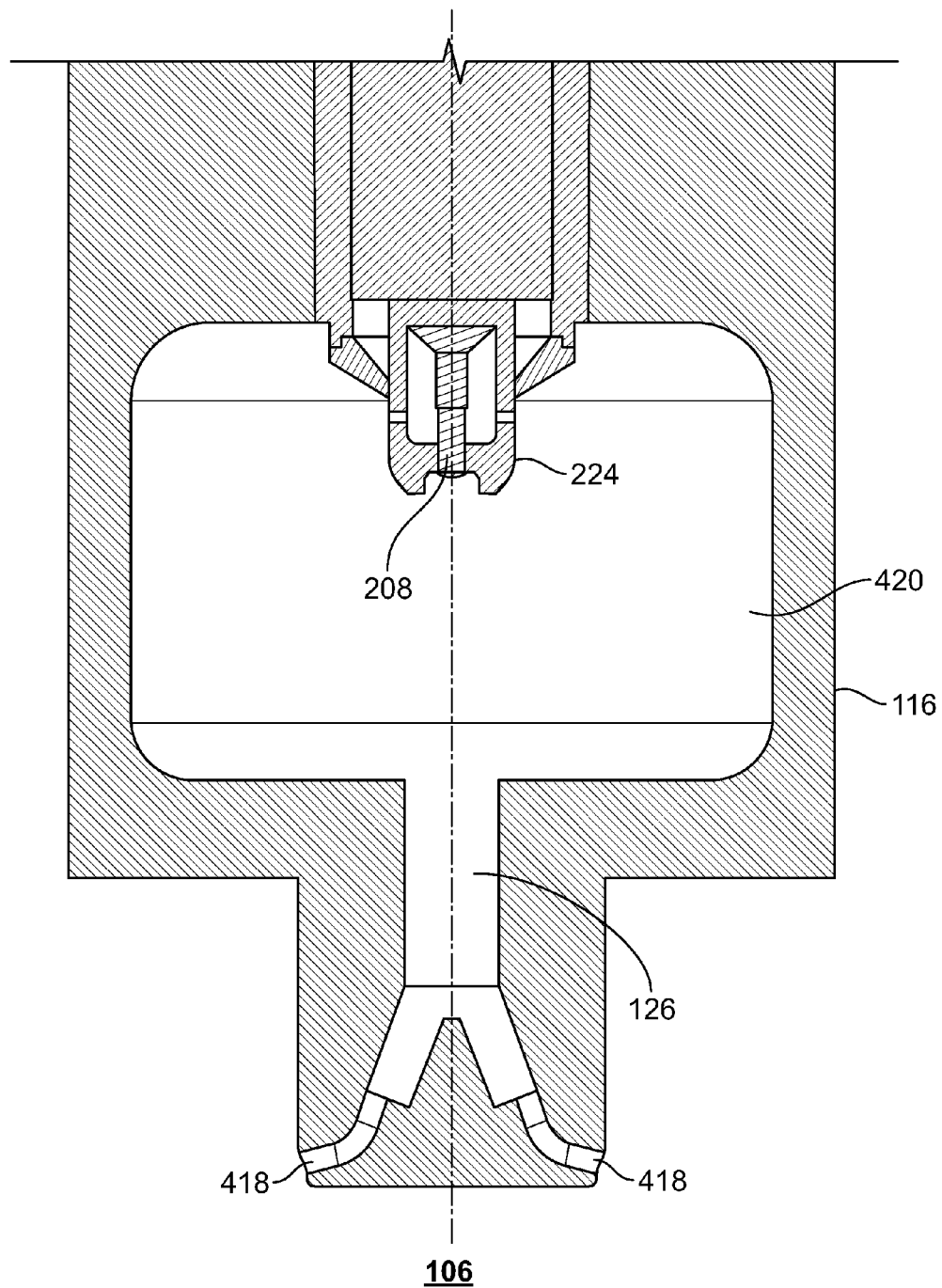

FIG. 4E is an igniter plug has the ignition bodies 208, 210 extending into the antechamber 420. The tubular body 224 directs a portion of the incoming fresh charge from the central passage of the antechamber 420, outside of the tubular body 224 and laterally to recirculate and generate the toroidal vortex in the antechamber 420. The tubular ignition body 210 can extend back to the base 212 and have lateral holes to eject residuals (before ignition) and the flame kernel (after ignition) or can have one or more spaced apart legs extending back to the base.

Figure 4F:
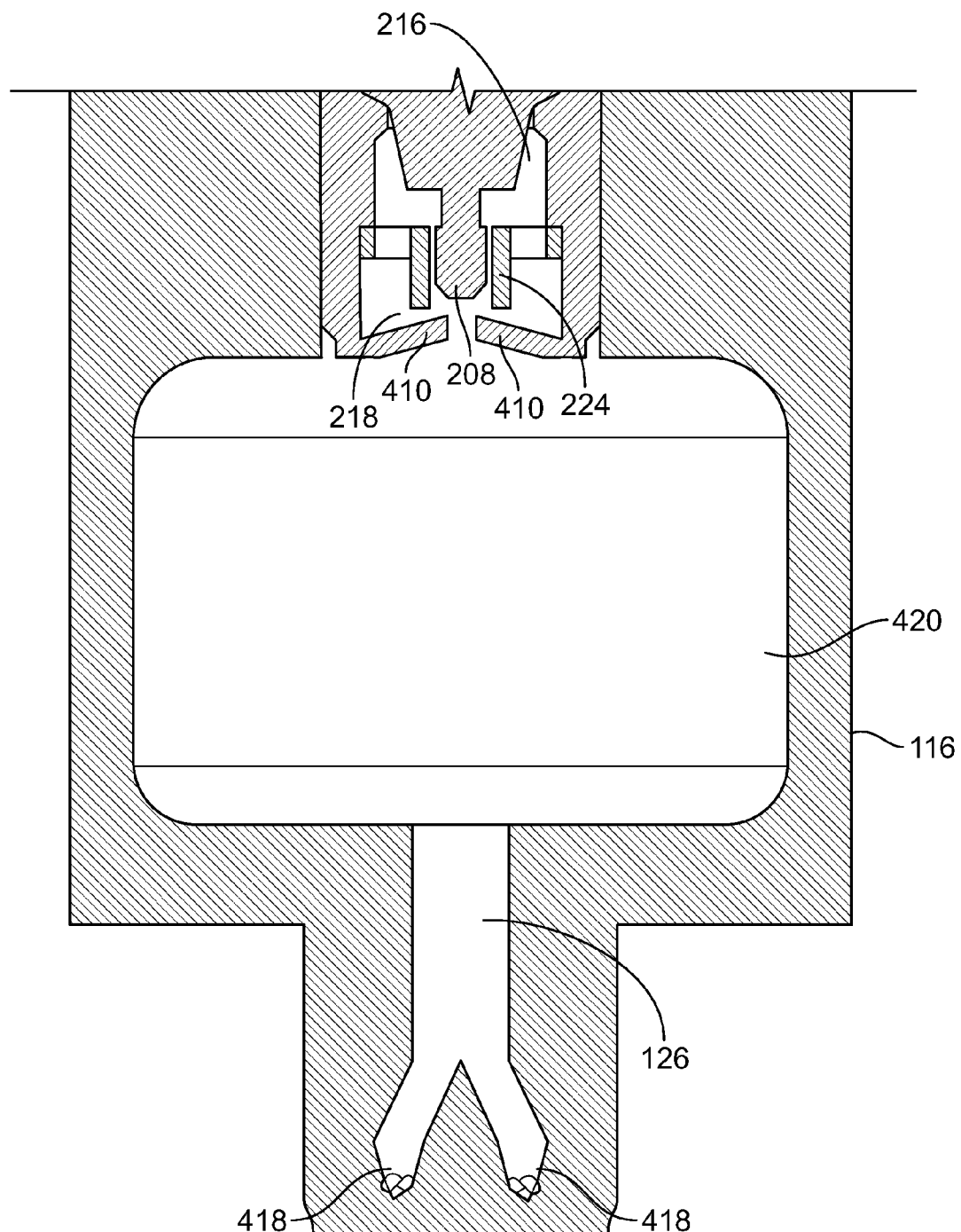
Figure 4G:
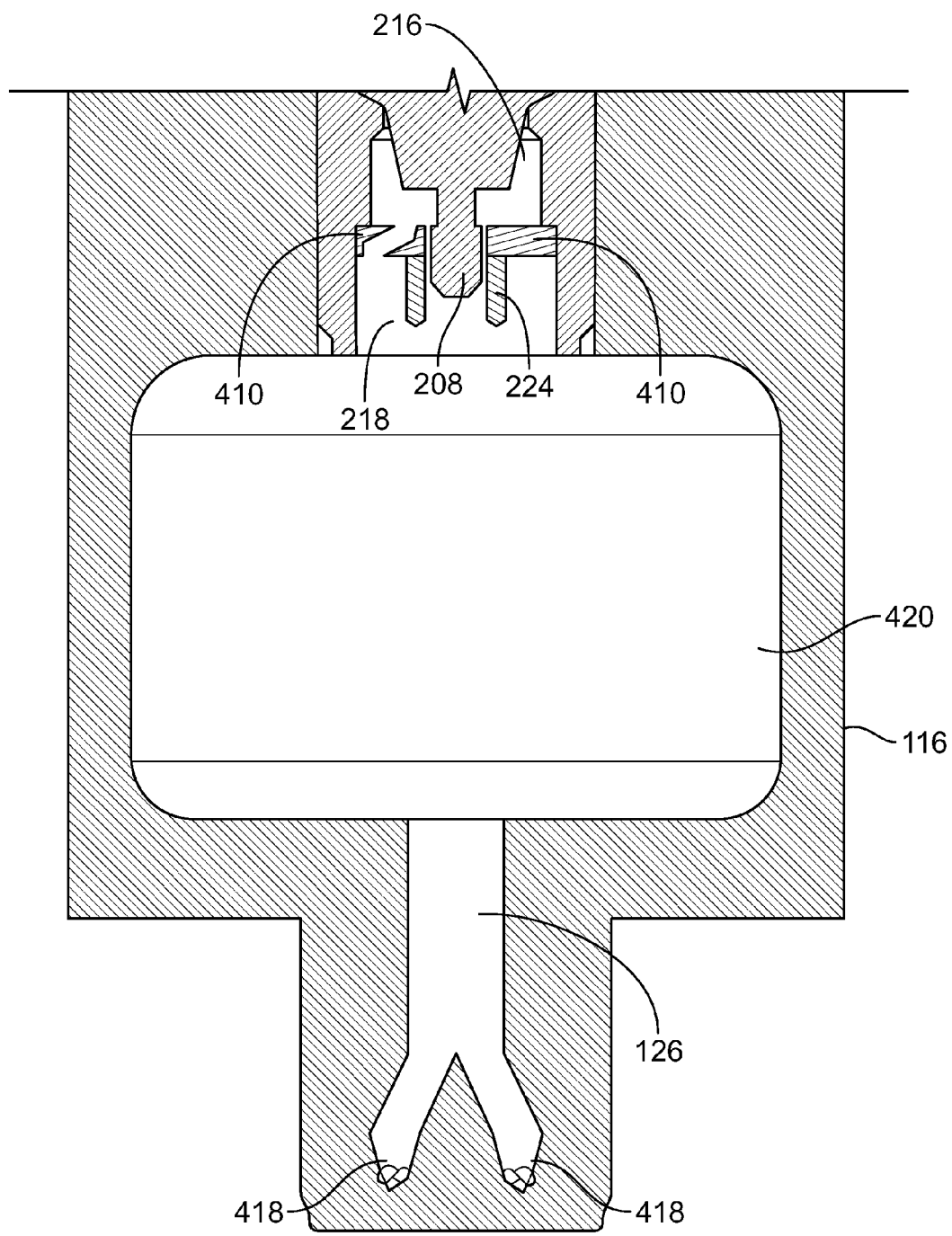
Figure 4H:
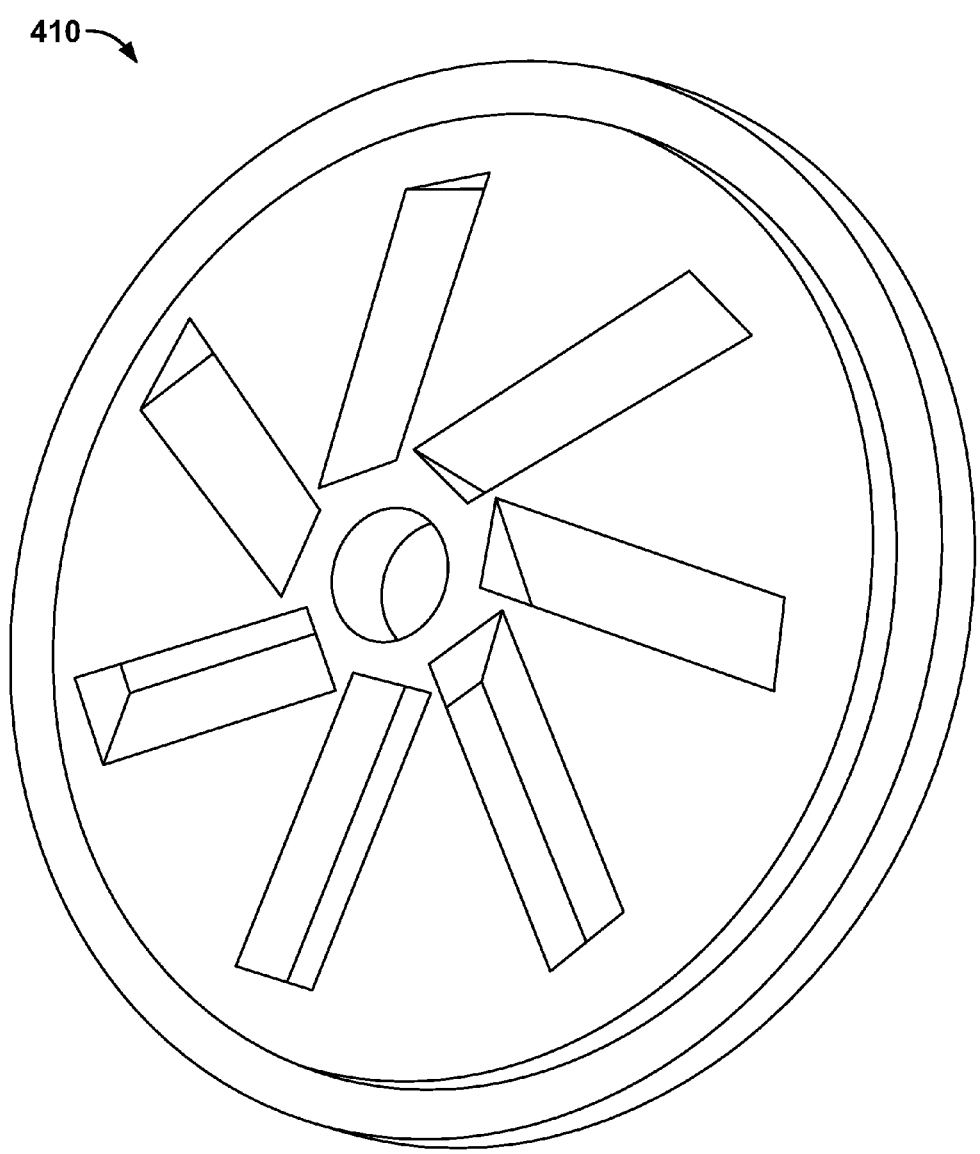
FIG. 4H is a perspective view of a slotted disk end cap.

FIG. 4F is an igniter plug with a slotted disc 410 as end cap. An example slotted disc 410 is shown in FIG. 4H. The disc 410 has a central opening which directs incoming cool, fresh air/fuel mixture into the tubular body 224. The disc 410 also has a plurality of slots or holes surrounding the central opening. The slots can be canted or angled to generate a swirl within the incoming fresh charge. After ignition, the slots and central opening are also jet passages that nozzle combusting air/fuel mixture from the prechamber into flame jets that reach deep into the antechamber 420 and ignite the charge in the antechamber 420. A portion of the incoming fresh charge is directed by the disc 410 laterally into the antechamber 420 to recirculate and generate the toroidal vortex. FIG. 4G is an igniter plug with an open end and a slotted disk 410 supporting the tubular body 224 and tubular ignition body 210.

Referring back to FIGS. 4A-4G, the example antechamber 420 is cylindrical rather than slightly tapered as in FIG. 3, yet achieves the same toroidal vortex of circulation flow. The openings 418 are shaped to reduce loss of flow velocity of the flame from the antechamber to the combustion chamber and of the inflow of air/fuel mixture into the prechamber. The openings 418 can also have an exit angle that is complementary to the angle at the top of the piston. In certain instances, the exit angle can direct the flow parallel to the face of the piston and/or toward the face of the piston at a shallow angle. The openings 418 can meet with the central passage 126 at an angle that smoothly transitions incoming flow through the openings 418 into the central passage 126, for example, to reduce velocity losses into the prechamber. The openings 418 can be curved (FIGS. 4A-4E) or for manufacturing purposes formed of one or more straight sections (FIGS. 4F, 4G).

Figure 5:
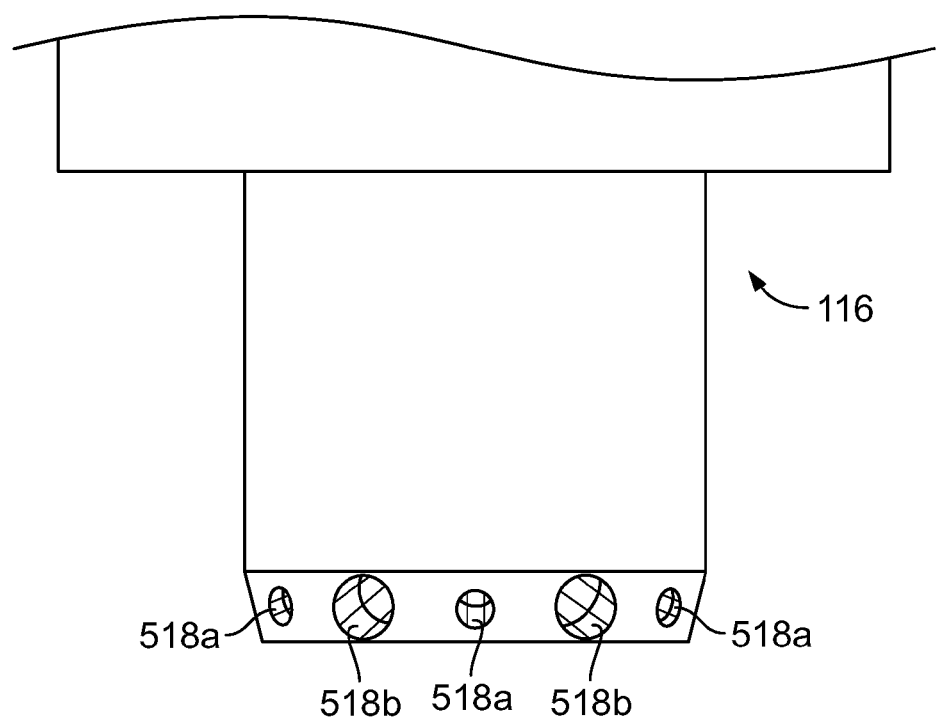
FIG. 5 is an exterior perspective view of a portion of an example plug carrier showing multiple openings.

FIG. 5 shows an exterior view of the carrier, showing that openings 418 can have one or more exterior profiles 518a, 518b of different size (i.e., flow area). In the present example, the exterior profiles 518a have a smaller flow area than the profiles 518b. Although only two sizes of profiles are shown, fewer or more profiles can be provided. The smaller profiles 518a jet the flames a shorter distance into the combustion chamber than the larger-diameter openings 518b, in part because the jets from the smaller profiles 518a have less mass and momentum. The openings 518a, 518b can also have different angles to direct the flame jets into different regions of the combustion chamber 106. Flame jets with multiple distances or multiple angles can better fill the combustion chamber with flame jets to enable more complete combustion of the fuel/air mixture in combustion chamber 106.

An antechamber and igniter assembly as described herein can enable a leaner mixture to be used in the combustion chamber and inside the igniter plug. In some implementations, it can enable consistent combustion of very lean air/fuel mixtures without a supply auxiliary fuel to the igniter plug. In some implementations, the assembly enables k in the combustion chamber and the k in the igniter plug equal to or greater than 1.6 (i.e., 1.7, 1.8, 1.9 or greater) to be consistently ignited without an auxiliary fuel feed into the igniter plug, where k is defined as the ratio of the actual air-to-fuel ratio to the stoichiometric ratio (i.e., stoichiometric ratio is k=1). The antechamber and prechamber assembly also enables faster combustion. In some implementations, the combustion can occur in less than 20 degrees of crank angle in engines with a bore greater than 160 mm.

Figure 6:
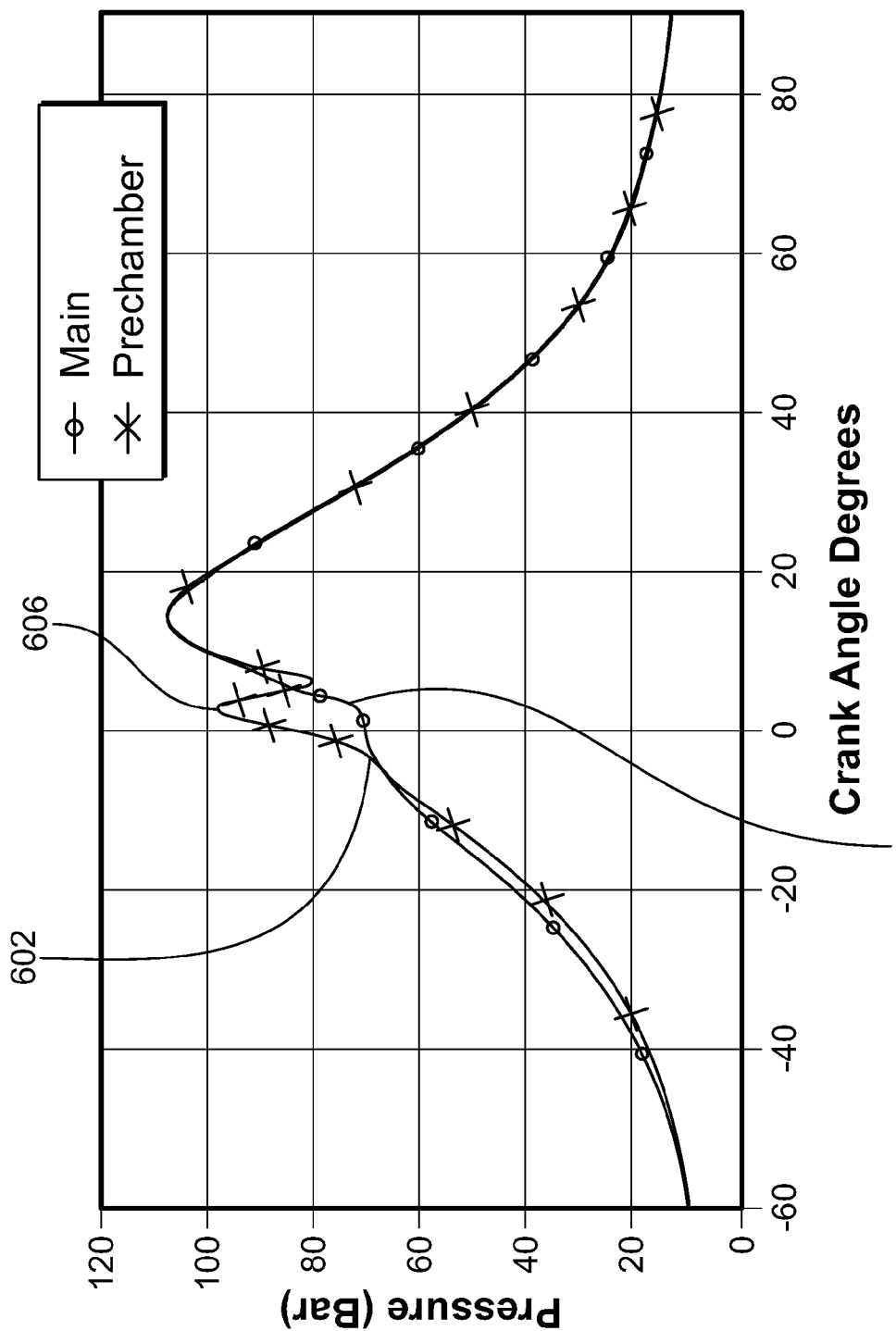
FIG. 6 is a graph of mean pressure in the main combustion chamber and in the igniter plug over crank angle for an example M18 sized igniter plug.

The ability of the igniter plug to consistently ignite very lean air/fuel mixtures without auxiliary fuel into the igniter plug is evidenced by the pressure rise upon ignition exhibited by the plug. FIG. 6 shows a graph of mean pressure in the main combustion chamber and in the igniter plug over crank angle for an example M18 sized igniter plug in an engine operating at 1500 rpm, with an effective compression ratio of 12 and indicated mean effective pressure (IMEP) or approximately 18 bar. The flow area into the pre-chamber enclosure of the igniter plug (i.e., via the openings, such as openings 202, 222) is 60 mm$^2$. Neither the pre-chamber enclosure nor the antechamber have an auxiliary fuel supply, and thus are only igniting the air/fuel mixture received from the combustion chamber.

The pressure rise in the pre-chamber enclosure tracks and slightly trails the pressure rise in the combustion chamber prior to ignition. At ignition in the pre-chamber enclosure, at point 602 a few degrees before top dead center (TDC, i.e. 0 degrees), ignition has not yet begun in the combustion chamber. From ignition in the pre-chamber enclosure, point 602, the pressure in the pre-chamber enclosure rises over the pressure in the combustion chamber to a maximum mean pressure, at point 606, that is approximately 20 bar higher than the maximum mean pressure in the combustion chamber prior to ignition in the combustion chamber. This pressure rise is indicative of strong and healthy ignition and combustion within the pre-chamber enclosure. At point 604, ignition in the combustion chamber begins as flames are jetted from the antechamber into the combustion chamber, and the pressure rises to reach the maximum post ignition pressure in the combustion chamber. The flow area into the pre-chamber enclosure (noted above as being 60 mm$^2$) affects the pressure rise in the chamber, as well as the rate air/fuel mixture is exchanged in and out of the igniter plug. One measure of the strength of the ignition in the pre-chamber is the product of this flow area times the pressure rise in the pre-chamber. In certain instances, the igniter plug, without an auxiliary supply of fuel, can achieve a maximum mean pressure in the pre-chamber enclosure after ignition in the pre-chamber enclosure and before ignition in the combustion chamber time the flow area into the pre-chamber enclosure to be 1200 bar-sqmm or greater.

A number of examples have been described. Nevertheless, it will be understood that various modifications may be made. Accordingly, other examples are within the scope of the following claims.

We claim:

1. A system for igniting a mixture in an internal combustion engine, the system comprising:
    a plug body adapted to couple to the internal combustion engine and comprising a shell;
    a first ignition body carried by the plug body in the shell;
    a second ignition body carried by the plug body in the shell and adjacent the first ignition body to define a flame kernel initiation gap between the second ignition body and the first ignition body;
    an enclosure comprising a jet passage and defining a chamber about an end of the shell that is larger in volume than a fluid containing interior of the shell, the chamber adapted to direct flow incoming through the jet passage to circulate in the chamber and recombine with the incoming flow adjacent to the jet passage and orthogonally to or in the general direction of the incoming flow.

2. The system of claim 1 where the enclosure comprises an outer enclosure and the chamber comprises an outer chamber; and
    where the system further comprises an inner enclosure within the outer chamber and defining an interior chamber that encloses the first and second ignition bodies, the inner enclosure comprising a jet passage adapted to direct a flow incoming through the jet passage of the inner enclosure primarily toward the first and second ignition bodies.

3. The system of claim 1, comprising a tubular receiver housing comprising the enclosure, the receiver housing adapted to receive and couple to the plug body and adapted to couple to the internal combustion engine.

4. A system for igniting a mixture in an internal combustion engine, the system comprising:
    a plug body adapted to couple to the internal combustion engine and comprising a shell;
    a first ignition body carried by the plug body in the shell;
    a second ignition body carried by the plug body in the shell and adjacent the first ignition body to define a flame kernel initiation gap between the second ignition body and the first ignition body;
    an enclosure comprising a jet passage and defining a chamber about an end of the shell that is larger in volume than a fluid containing interior of the shell, the chamber adapted to direct flow incoming through the jet passage to circulate in the chamber and recombine with the incoming flow adjacent to the jet passage and orthogonally to or in the general direction of the incoming flow;
    where the enclosure comprises an outer enclosure and the chamber comprises an outer chamber;
    where the system further comprises an inner enclosure within the outer chamber and defining an interior chamber that encloses the first and second ignition bodies, the inner enclosure comprising a let passage adapted to direct a flow incoming through the let passage of the inner enclosure primarily toward the first and second ignition bodies;
    where the jet passage of the outer enclosure comprises a central passage oriented to direct incoming flow to impinge onto the inner enclosure; and
    where the jet passage of the inner enclosure comprises a central jet passage oriented to receive flow impinging on the inner enclosure and direct the received flow primarily towards the flame kernel initiation gap.

5. The system of claim 4, where second ignition body surrounds the first ignition body and comprises a tubular portion extending axially forward, beyond the first ignition body.

6. The system of claim 5, where the inner enclosure comprises:
a peripheral jet passage adapted to receive flow impinging on the inner enclosure and direct the received flow to an exterior of the second ignition body and to swirl in the inner enclosure.

7. The system of claim 6, where the second ignition body is configured to cause the flow in the ignition gap to flow rearward and to protect flow in the ignition gap from disturbances from flow from the peripheral jet passage.

8. The system of claim 4, where the inner enclosure is conical and is adapted to deflect flow from the central passage, laterally towards a sidewall of the outer chamber.

9. The system of claim 8, where the outer chamber is shaped to direct flow from the central passage to generate a generally toroidal flow vortex in the outer chamber and generate turbulence in the outer chamber.

10. The system of claim 1, where the second ignition body is a tube that is continuous without any breaks.

11. A method of igniting an air/fuel mixture in an internal combustion engine, the method comprising:
receiving the air/fuel mixture as an incoming air/fuel mixture flow from a combustion chamber of the internal combustion engine into an enclosure adjacent the combustion chamber;
directing the air/fuel mixture received into the enclosure toward a first and second ignition bodies and to circulate in the enclosure and to recombine with the incoming air/fuel mixture flow orthogonally to or generally in the direction of the incoming air/fuel mixture flow;
igniting the air/fuel mixture in a flame kernel initiation gap between the first and second ignition bodies.

12. The method of claim 11, where the enclosure is an outer enclosure and directing the air/fuel mixture received into the outer enclosure toward the first and second ignition bodies comprises directing the air/fuel mixture received into the outer enclosure to impinge on an inner enclosure within the outer enclosure; and
comprising receiving the air/fuel mixture impinging on the inner enclosure into the inner enclosure and directing the air/fuel mixture received into the inner enclosure into the flame kernel initiation gap.

13. The method of claim 12, where directing the air/fuel mixture received into the outer enclosure to impinge on an inner enclosure comprises displacing combustion residuals around a passage through the inner enclosure.

14. The method of claim 12, comprising directing the air/fuel mixture directed to impinge on the inner enclosure to generate a toroidal vortex in the outer enclosure.

15. The method of claim 12, where directing the air/fuel mixture received into the inner enclosure into a flame kernel initiation gap comprises directing the air/fuel mixture with a central passage of the inner enclosure primarily into the flame kernel initiation gap;
comprising directing the air/fuel mixture received into the inner enclosure with a peripheral passage of the inner enclosure to swirl around an exterior of the second ignition body; and
comprising protecting air/fuel mixture in the flame kernel initiation gap from flow disturbances from the swirling air/fuel mixture with the second ignition body.

16. The method of claim 12, comprising:
transporting a flame kernel, formed by igniting air/fuel mixture in the flame kernel initiation gap, towards a rear of inner enclosure, away from the combustion chamber;
igniting air/fuel mixture from the rear of the inner enclosure toward a front of the inner enclosure using the flame kernel;
jetting combusting air/fuel mixture from the inner enclosure into the outer enclosure and igniting air/fuel mixture in the outer enclosure; and
jetting combusting air/fuel mixture from the outer enclosure into the combustion chamber.

17. The method of claim 12, where igniting air/fuel mixture in a flame kernel initiation gap between the first and second ignition bodies comprises causing the maximum mean pressure in the inner enclosure after ignition in the inner enclosure and before ignition in the combustion chamber times the flow area into the inner enclosure to be 1200 bar-sqmm or greater.

18. The method of claim 12, where lambda in the combustion chamber is 1.8 or greater and no auxiliary fuel is supplied to the inner enclosure.

19. An internal combustion engine, comprising:
a plug body;
a first ignition body carried by the plug body;
a second ignition body carried by the plug body adjacent the first ignition body to define a flame kernel initiation gap between the second ignition body and the second ignition body; and
an enclosure comprising a jet passage, the enclosure adapted to direct a portion of flow incoming through the jet passage to circulate in the enclosure and recombine with the incoming flow through the jet passage orthogonally to or generally in the direction of the incoming flow through the jet passage.

20. The internal combustion engine of claim 19, where the enclosure comprises an outer enclosure; and
comprising an inner enclosure within the outer enclosure, the inner enclosure comprising a jet passage and defining an inner chamber enclosing the first ignition body and the second ignition body.

21. The internal combustion engine of claim 19, comprising a tubular receiver housing comprising the enclosure and adapted to receive and couple to the plug body.

22. The internal combustion engine of claim 20, where the jet passage of the outer enclosure comprises a central jet passage adapted to direct air/fuel mixture from a combustion chamber of the engine to impinge on the inner enclosure and displace combustion residuals from adjacent the inner enclosure.

23. The internal combustion engine of claim 22, where the jet passage of the inner enclosure comprises:
a central jet passage adapted to direct air/fuel mixture primarily into the flame kernel initiation gap; and
a peripheral jet passage adapted to direct air/fuel mixture primarily exterior to the second ignition body.

* * * * *

UNITED STATES PATENT AND TRADEMARK OFFICE
CERTIFICATE OF CORRECTION

PATENT NO. : 8,839,762 B1  
APPLICATION NO. : 13/913840  
DATED : September 23, 2014  
INVENTOR(S) : Domenico Chiera, Nolan Polley and Gregory James Hampson Page 1 of 1

It is certified that error appears in the above-identified patent and that said Letters Patent is hereby corrected as shown below:

On the Title Page Item (72) under Inventors, Line 4, replace "Colllins" with -- Collins --

Title Page 3 Item (56) under Other Publications, Column 2, Line 21, replace "FISTA" with -- FISITA --

In the Specification,

Column 1, Line 32, delete "and" after -- cap; --

Column 1, Line 34, replace "openings." with -- openings; and --

Column 9, Line 9, replace "k" with -- $\lambda$ --

Column 9, Line 10, replace "k" with -- $\lambda$ --

Column 9, Line 13, replace "k" with -- $\lambda$ --

Column 9, Line 14, replace "k" with -- $\lambda$ --

In the Claims,

Column 10, Line 53, replace "let" with -- jet --

Column 10, Line 54, replace "let" with -- jet --

Column 12, Line 29, replace "second" with -- first --

Signed and Sealed this  
Tenth Day of February, 2015

Michelle K. Lee  
*Deputy Director of the United States Patent and Trademark Office*